United States Patent [19]

Cinquin

[11] Patent Number: 4,788,622

[45] Date of Patent: Nov. 29, 1988

[54] DEVICE FOR INDICATING THE SHORT-CIRCUITING OF A LIGHTNING ARRESTER

[75] Inventor: Jean-Pierre Cinquin, Siccieu St Julien, France

[73] Assignee: Ferraz, Lyon, France

[21] Appl. No.: 78,679

[22] Filed: Jul. 28, 1987

[30] Foreign Application Priority Data

Aug. 28, 1986 [FR] France ................................ 86 12297

[51] Int. Cl.[4] ................................................ H02H 9/04

[52] U.S. Cl. .................................... 361/124; 361/127; 340/647; 340/650; 324/555

[58] Field of Search ............... 324/551, 552, 555, 556; 340/635, 647, 650, 653, 654, 664; 361/117, 118, 124, 125, 126, 127; 337/28, 31, 34, 241, 265, 404, 407

[56] References Cited

U.S. PATENT DOCUMENTS

| | | | |
|---|---|---|---|
| 1,526,770 | 2/1925 | Brain | 324/552 |
| 2,498,120 | 2/1950 | Fox | 361/118 |
| 3,869,650 | 3/1975 | Cunningham et al. | 361/117 |
| 4,259,666 | 3/1981 | Takahashi et al. | 340/650 |
| 4,507,701 | 3/1985 | Fujiwara et al. | 340/664 |

FOREIGN PATENT DOCUMENTS

| | | | |
|---|---|---|---|
| 919788 | 2/1963 | United Kingdom | 337/28 X |

*Primary Examiner*—A. D. Pellinen
*Assistant Examiner*—H. L. Williams
*Attorney, Agent, or Firm*—Dowell & Dowell

[57] ABSTRACT

In order visually to indicate the existence of a "continuation" current through a lightning arrester, an indicator is associated therewith, which is formed by an elastically deformable strip maintained retracted against capsule electrode by a retention mechanism which is associated with an electrical filter which causes fusion of a fusible wire under the effect of a "continuation" current. Once its end is released, the strip projects outwardly of the lightning arrester and marks the location of the defective insulation.

7 Claims, 3 Drawing Sheets

DEVICE FOR INDICATING THE SHORT-CIRCUITING OF A LIGHTNING ARRESTER

BACKGROUND OF THE INVENTION

1. Field of the Invention

The present invention relates to lightning arrester devices for the protection of electric lines, and especially medium-high voltage overhead lines wherein a visual indication is given of a short-circuit condition in the arrester.

2. History of the Related Art

Lightning arrester devices for the protection of medium high-voltage overhead lines are known generally to comprise an insulating body provided with two connection capsules or electrodes respectively connected to the electric line to be protected and to earth or ground. This body contains an element which, in normal operation, ensures mutual insulation of said two capsules electrodes, while being capable of becoming momentarily current-bearing under the effect of a sudden rise in voltage due to lightning striking the line. Once the high-voltage shock wave has been dissipated, the element must become perfectly insulating again.

However, this return to insulating state sometimes takes place under poor conditions, due in particular to damage of the insulation element, in which case a so-called "continuation" current appears which in fact constitutes a short-circuit on the electric line. As an electric line most often coprises a large number of lightning arresters, it is difficult in practice to determine which is the device producing the "continuation" current and the short circuit.

SUMMARY OF THE INVENTION

It is an object of the present invention to overcome this drawback by providing an indicator adapted to be incorporated in the conventional devices with a view to indicating, in perfectly visible manner, the possible short-circuiting of the lightning arrester with which said indicator is associated.

The indicator according to the invention is principally noteworthy in that it comprises a rectilinear strip made of an elastically deformable material so as to be held down and retracted by deformation against the lightning arrester, and of which one of the ends is secured with the latter while the opposite end is held in position by means of a bolt mechanism dependent on electrical release means actuated as soon as a "continuation" current passes through the lightning arrester to which the indicator strip is attached.

The indicator strip is virtually invisible as long as it is held down against the body of the lightning arrester, while, as soon as the bolt mechanism has released it, the strip unfurls suddenly, and creates a marker flag which projects laterally on the body and which may consequently be very easily detected.

BRIEF DESCRIPTION OF THE DRAWINGS

The invention will be more readily understood on reading the following description with reference to the accompanying drawings, in which.

DESCRIPTION OF THE PREFERRED EMBODIMENT

Figure 1:
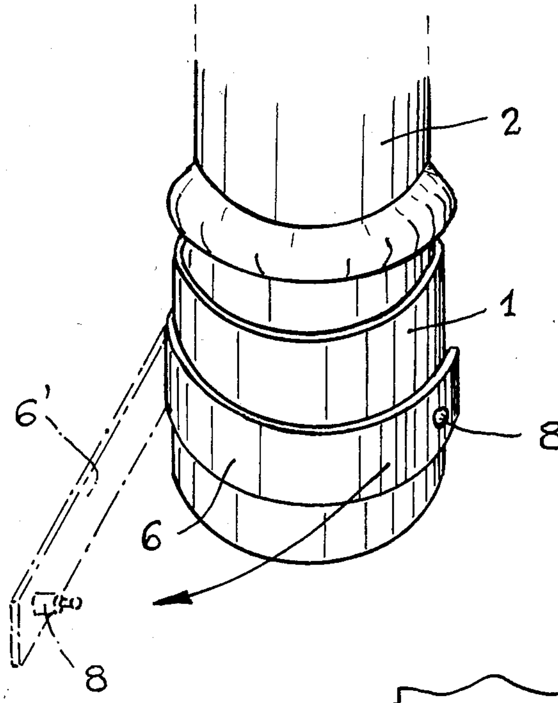
FIG. 1 is a view in perspective showing an indicator according to the invention mounted on the body of a lightning arrester of known type.

Referring now to the drawings, reference 1 in FIG. 1 designates the connection capsule or electrode provided at the base of the insulating body 2 of any lightning arrester, which, may be assumed to be of the type as described in Applicant's French Patent Application No. 86 09572 filed on June 27, 1986. The lower part of the insulation element 3 (FIG. 2) of this lightning arrester is connected by a spring 4 to a metal disc 5, which is itself connected to capsule 1 through the indicator electrical filter coil assembly forming the subject matter of the present invention.

The indicator firstly comprises a rectilinear strip 6 made of an elastically deformable material such as spring steel. One of the ends of this strip 6 is permanently fixed to the capsule or electrode 1 by a rivet 7, while the opposite end, provided with a retaining pin 8, cooperates with a bolt or retention mechanism so that the strip 6 is capable of being maintained held down and retracted against the capsule or electrode 1.

Figure 2:
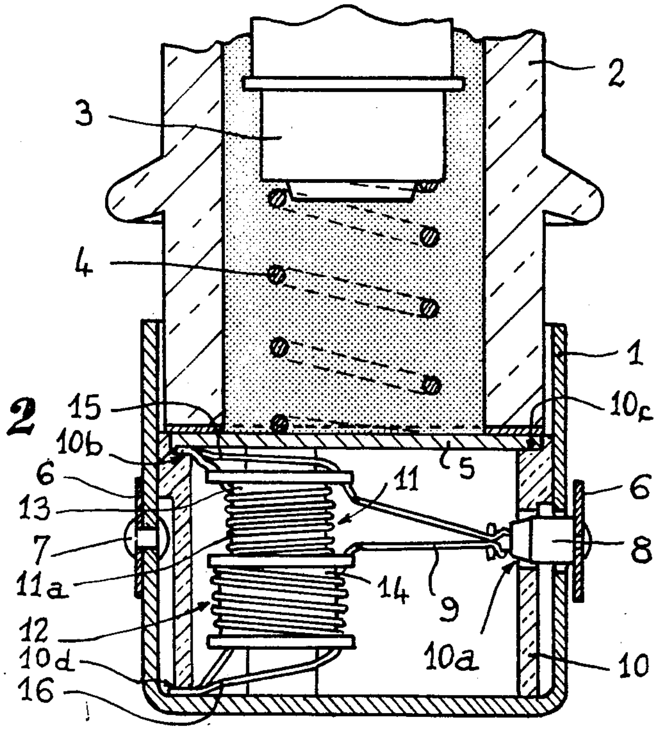
FIG. 2 is a cross section through the lower part of the lightning arrester and of the indicator which is incorporated therein.

In the embodiment of FIG. 2, this retention mechanism comprises a fusible wire 9 in the form of a pin, of which the central part is attached to the sectioned shank of the pin 8, which passes through a hole in the capsule or electrode 1 to slide axially in an opening 10*a* in an insulating spacer 10 maintained between the disc 5 and the bottom of the the capsule or electrode 1.

Figure 3:
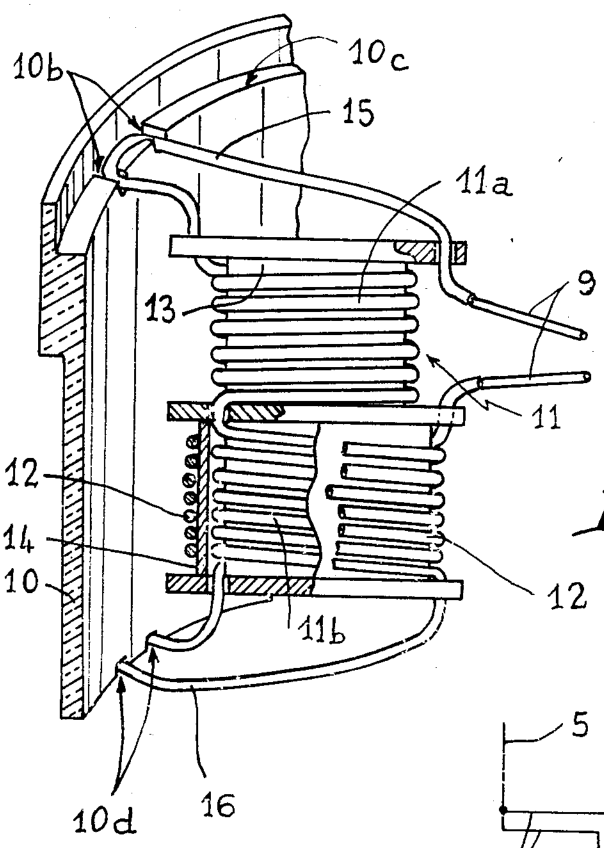
FIG. 3 shows on is an enlarged partial cross sectional view showing the electrical coil assembly for controlling the release of the indicator of the present invention.
Figure 4:
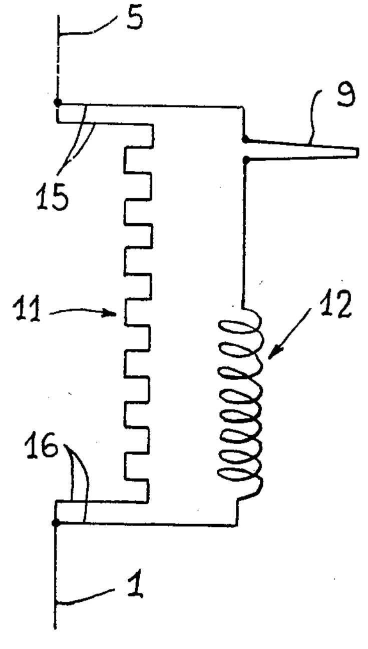
FIG. 4 is a diagram of the corresponding electrical connection of the coil assembly of FIG. 3.

As shown in detail in FIGS. 3 and 4, the ends of the fusible wire 9 are connected to a filter formed by two coils 11 and 12 connected in parallel between the disc 5 and the connection or electrode capsule 1.

Coil 11 is made on a support 13 and includes two superposed windings 11*a* and 11*b* of which the turns are inverted in order to cancel the magnetic field generated and consequently to obtain a non-inductive coil forming resistor. Coil 12 is made on a support 14 with a lager inner diameter so as to surround one or the other of the windings 11*a* and 11*b* and to obtain in any case a self-inducting coil.

From the structural standpoint, it should be observed that the assembly of the filter described hereinabove is made by a continuous wire of which one end, connected to the corresponding end of the fusible wire 9, presents a large loop 15 which is engaged in two notches 10made in an upper shoulder 10*c* of the insulaing spacer 10, which shoulder 10*c* is intended to form a support for the metal disc 5 described hereinabove. It will be readily appreciated that, if care is taken to make the notches 10*b* with a depth slightly less than the diameter of the wire of the loop 15, during mounting of the assembly, this wire will be crushed between the bottom of the notches and the lower face of the disc 5, so that an efficient electrical connection is obtained without any other particular means.

In the same way, the end of the wire which leaves the lower winding 11*b* of the non-inductive coil 11 forms a wide loop 16 which is itself engaged in two notches 10*d* made in the lower edge of the insulating spacer 10, in order to ensure automatic electrically connect the output of the filter with the capsule or electrode 1 connected to earth or ground.

The free end of the lower loop 16 penetrates on the large-diameter support 14 to constitute coil 12 of which the emerging end is connected to the free end of the fusible wire 9, which is thus connected in series with the coil 12.

Figure 5:
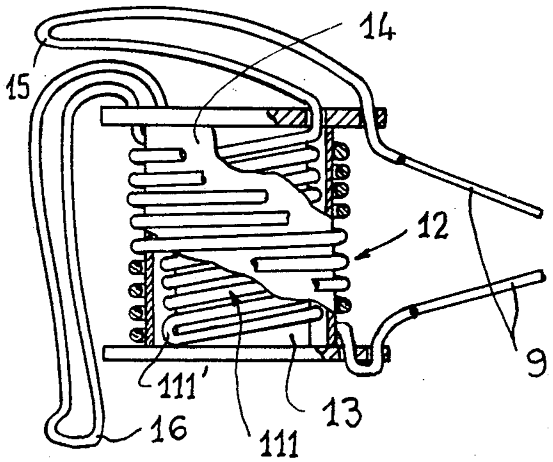
FIG. 5 illustrates a variant embodiment of the coil assembly of FIG. 3.

Concerning the practical embodiment of the non-inductive coil, the variant illustrated in FIG. 5 may be employed, wherein a single winding 111 is provided with all the turns directed in the same direction, it being understood, however, that the coil is made double (central loop referenced 111') so that the current circulates in opposite directions in two adjacent turns. Under these conditions, the magnetic field is cancelled under better conditions than in the case of FIG. 3. The self-inducting coil 12 is made on an outer support 14, in the same manner as in FIG. 3.

Operation of the filter 11-12 or 111-12 associated with the fusible wire 9 follows from the foregoing explanations and is readily understood.

When the overhead line with which the lightning arrester according to the invention is associated is under normal voltage, the insulation element 3 operates perfectly and opposes any link between the overhead line and earth or ground.

On the other hand, when lightning strikes this overhead line, determining a sudden rise in intensity, the self-inducting coil 12 instantaneously ensures blockage of the very strong DI/DT, with the result that the very high voltage current can pass neither through said coil nor through the fusible wire 9 connected in series therewith and which consequently continues to hold the pin 8 and strip 6 efficiently. Consequently, this current is obliged to go to earth through the resistor formed by the non-inductive coil 11 or 111, making it possible, after evacuation, for the insulation element 3 to return to its initial state in which it opposes any passage of current.

If, on the contrary, further to damage of aging of the insulation element 3, the latter allows a "continuation" current to pass which obviously provokes a short-circuit on the overheadline protected and the disjunction thereof from the network, such lightning arrester, among the different ones placed on line, must be located.

Now, it will be readily appreciated that, due to its non-inductive character, the coil 11 or 111 prevents or at least brakes the passage of the "continuation" current at 50 Hertz, so that this current is obliged to pass through coil 12 and the fusible wire 9 connected in series therewith. As this fusible wire is made to melt under this current, it consequently releases the pin 8. Due to its elastic resistance to deformation, the end of the strip 6 is itself released, with the result that it suddenly resumes its initial rectilinear position, thus projecting laterally with respect to the body 1 of the lightning arrester, like a marker flag (position indicated in broken lines at 6' in FIG. 1).

Such a marker flag may be very easily detected, especially if the face of the strip 6 normally applied against the capsule 1 has been coloured bright red or luminous yellow. The fusible wire 9 may, of course, be replaced with a view to repairing the indicator, after the lightning arrester itself has been repaired.

Figure 6:
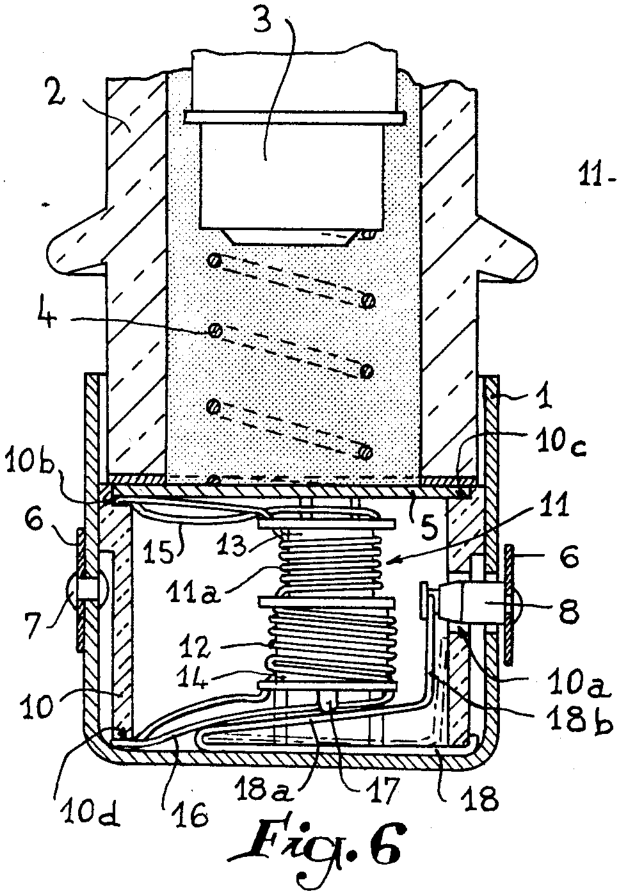
FIG. 6 is a cross section similar to that of FIG. 2, but corresponding to another embodiment of the invention.
Figure 7:
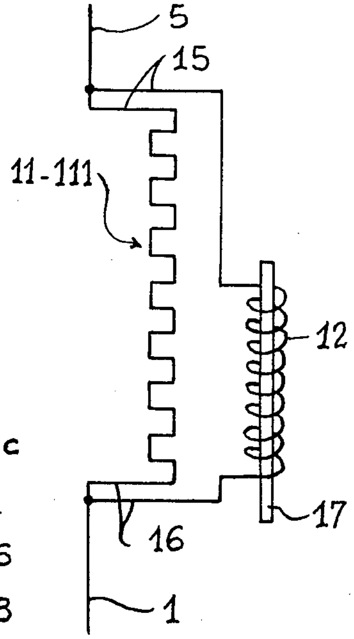
FIG. 7 shows the electrical connection diagram corresponding to FIG. 6.

FIGS. 6 and 7 illustrate another embodiment of the invention, wherein the support 13 of the non-inductive coil 11 or 111 is arranged to slidably receive a mobile core 17 similar to that of an electromagnet and adapted to form bolt mechanism in cooperation with a trigger 18. The lower end of this core is in contact with the deformable part 18*a* of the trigger 18, which abuts against the inner face of the connection capsule 1. The trigger 18 extends vertically at 18*b* beyond the deformable part 18*a* to present a terminal part in the form of an upwardly open fork, inside which is introduced the groove of the sectioned shank of the retaining pin 8 associated with the strip 6.

The general operation of this embodiment is identical to that set forth hereinabove with reference to FIGS. 2 to 5, except for the bolt mechanism which is constituted by the core 17 and trigger 18. This latter retains the pin 8 in the locked position, until, under the effect of the passage of the "continuation" current, the core 17 moves downwardly and the deformable part 18*a* of the trigger 18 is deformed under the pressure that the core 17 exerts thereon (shown in broken lines in FIG. 6). The downward displacement of parts 18*a* and 18*b* of the trigger releases the pin 8 from the terminal retaining fork, so that the indicator strip unfurls laterally in the manner illustrated in FIG. 1.

Moreover, it must be understood that the foregoing description has been given only by way of example and that it in no way limits the domain of the invention which would not be exceeded by replacing the details of execution described by any other equivalents. In particular, the invention also covers lightning arresters equipped with a short-circuiting indicator of the type described hereinabove.

What is claimed is:

1. An indicator for marking the short-circuit condition of a lightning arrester wherein the lightning arrester includes an insulated element which normally separtes a first electrode from a second electrode but which allows the first and second electrodes to be electrically connected to dissipate high current voltage and thereafter be electrically insulated from one another and wherein the second electrode includes inner and outer surfaces, the indicator comprising an elastically yieldable strip means having first and second ends, means for securing said first end of said strip means to said outer surface of the second electrode, an opening through said second electrode, retaining pin means carried by said strip means adjacent said second end thereof, said retaining pin means normally extending through said opening so that said second end of said strip means is in engagement with the outer surface of the second electrode, retention means mounted within the second electrode, said retention means normally being in engagement with said retaining pin means, said retention means including means responsive to continuation current between said first electrode and said second electrode so as to disengage said retention means from said retaining pin means whereby said second end of said strip means moves outwardly away from said second electrode to thereby give a visual indication of a short-circuit condition.

2. The indicator of claim 1 wherein said means responsive to continuation current includes a filter means, said filter means including first and second electrical coils, said first electrical coil being self-inductive so as to prevent current flow of very high voltagetherethrough, said second coil being non-inductive so as to prevent passage of said continuation current, said first and second coils being connected in parallel relationship with respect to one another, a fuseable link means being connected in series with said non-inductive coil, said retention means including a fuseable link means engaging said retaining pin means, and said fuseable link means being responsive to the passage of said continuation current to destruct and release said retaining pin means.

3. The indicator of claim 2 wherein said second non-inductive coil is formed of two windings having inverted pitches which cancel any magnetic field therethrough.

4. The indicator of claim 2 wherein said second non-inductive coil is formed of a single winding having loops extending in opposite directions whereby current flow therethrough is in opposite directions in adjacent loops.

5. The indicator of claim 2 wherein the lightning arrester includes a metal disk which is spaced from said second electrode by an insulation member, upper and lower notches in said insulation member adjacent said metal disk and said second electrode, said first and second coils being made of a continuous wire provided with two connection loops, one of said connection loops being engaged with said upper notch and the other of said connection loops being engaged which is slightly less than the diameter of said wire whereby when said loops are positioned within said notches, said wires may be crushed to effect electrical contact between said metal disk and said second electrode.

6. The indicator of claim 1 wherein said retention means includes an electrically fuseable wire, said wire having a portion in engagement with said retaining pin means, and means for electrically connecting said wire between said first and second electrodes whereby said fuseable wire is destructed upon the flow of continuation current therethrough.

7. The indicator of claim 1 in which said retention means includes a deformable trigger means, said deformable trigger means having an outer end portion for engaging said retaining pin means and a yieldable inner end portion, an electrical filter means, said filter means having first and second coils connected in parallel, said first coil being of a self-induction type so as to prevent current of very high voltage from passing therethrough, said second coil being non-inductive so as to prevent the passage of said continuation current therethrough, a mobile core means disposed within said non-inductive coil, said mobile core means having an outer end portion which engages said yieldable inner end portion of said trigger means, said mobile core means being activated in response to said continuation current to engage said yieldable inner end portion of said trigger means to thereby release said outer end portion of said trigger means from said retaining pin means.

* * * * *